United States Patent [19]  
Carlson et al.

[11] Patent Number: 4,719,638  
[45] Date of Patent: Jan. 12, 1988

[54] DISCHARGE TUBE FOR A GAS LASER

[75] Inventors: Lee R. Carlson, Pleasanton; Denes A. Hegedus, Redwood City, both of Calif.

[73] Assignee: Spectra-Physics, Inc., San Jose, Calif.

[21] Appl. No.: 761,746

[22] Filed: Aug. 1, 1985

[51] Int. Cl.⁴ .............................................. H01S 3/03
[52] U.S. Cl. ........................................ 372/62; 372/61
[58] Field of Search ........................ 372/61, 62, 63, 34

[56] References Cited
U.S. PATENT DOCUMENTS
4,242,646 12/1980 Macken ................................. 372/61

Primary Examiner—Gene Wan
Attorney, Agent, or Firm—Fliesler, Dubb, Meyer & Lovejoy

[57] ABSTRACT

A discharge tube for a gas laser including an elongated cylindrical tube, a plurality of heat-conduction members spaced apart along the cylindrical tube and about the tube axis and having gas-flow return holes near the outer perimeter thereof, and a plurality of non-conductive, pronged, disc-shaped blocking members being positioned, respectively, in the space between and outside the volume of adjacent heat conduction members so as to be unattached to either adjacent heat conduction member.

19 Claims, 4 Drawing Figures

DISCHARGE TUBE FOR A GAS LASER

BACKGROUND OF THE INVENTION

1. Field of the Invention

The present invention relates generally to gas lasers and, more particularly, to discharge tubes for gaseous ion lasers having an internal gas return path.

2. Background Art

A variety of gas lasers are available for many different commercial applications, such as welding, cutting, and surgery. Each gas laser may have a uniquely structured gas discharge tube in which the laser action is performed. Generally, in the design of the gas discharge tubes trade-offs are made so as to, for example, solve particular problems and/or provide specific advantages, as may be required for particular applications of the laser.

The lower efficiency of ion lasers and level of input energy required to achieve an ionization giving rise to laser action results in generation of a substantial amount of heat which must be dissipated away from the discharge tube. Corresponding with the means chosen to dissipate accumulated heat build-up, ion lasers may be classified as radiatively cooled or conductively cooled. Conductively cooled structures store less heat enabling the tube to operate with lower temperature exterior surfaces which proves advantageous in certain applications.

Whether radiatively or conductively cooled, ion lasers are subject to movement of gas within the tube, a phenomenon well known in the art as gas pumping. Gas pumping may lead to a pressure inequilibrium along the length of the tube which is deleterious to the operation of the discharge tube as a laser. The effects of gas pumping may be overcome through provision of a gas return path through which gas may return from high pressure regions to low pressure regions. The return path may be outside the discharge tube as taught, for example, in U.S. Pat. No. 3,582,821 or inside the discharge tube as taught, for example, in U.S. Pat. No. 3,531,734. Internal returns are advantageous to certain applications in that they are less susceptible to breakage than external returns which must be handled with some care.

It is well known in the art that the gaseous discharge along the axis of the tube must be isolated from the gas flow feedback region sufficiently to prevent gaseous discharge, as caused by migrating ions, from arcing through the gas return path. This has been effectuated in radiatively cooled lasers, for example, in French Pat. No. 2,011,043 through the use of blocking baffles (18) and in several conductively cooled embodiments.

U.S. Pat. No. 3,531,734 and later U.S. Pat. No. 4,378,600 disclose internal feedback conduction-cooled segmented bore ion lasers through use of a large compartmentalized volume of gas in a return region from which the gaseous discharge is isolated, respectively speaking, by metallic cylinders the inner diameter of which serve as bores (element 18 in U.S. Pat. No. 3,531,734) and coaxial metallic cylinders radially removed from thinner bore elements (element 56 in U.S. Pat. No. 4,378,600) and affixed, as by brazing, to heat-conducting cups.

Another conduction-cooled segmented bore ion laser with an internal gas return, U.S. Pat. No. 3,501,714, discloses an "S"-shaped bend (FIGS. 4 and 5) in metallic heat-conducting members which contain peripheral grooves and slots to provide a gas return region isolated from the bore. Finally, in a similar vein, U.S. Pat. No. 3,670,262 discloses the isolation of the bore from the feedback and effectuation of an internal gas return in a conductively-cooled beryllium oxide ion laser through the use of off-axis gas return bores (20).

The embodiment addressed in the aforementioned patents each create a specific thermal distribution effect within the laser. For example, in the aforementioned patents, conduction-cooled segmented structures with internal feedbacks employ metallic isolation elements upon which the hot gas impinges. Additionally, a temperature gradient is present along the radial heat conduction path from the bore out through the discharge tube and the isolation members interface with the heat conduction path at various points along that gradiant.

The differences in thermal temperature distribution may cause thermal stress between the elements of the structure due to differential thermal expansion as well as alter the gas conductance characteristics which are highly temperature dependent. In particular, the large volume returns of U.S. Pat. Nos. 3,531,734 and 4,378,600, which provides a greater degree of gas storage fail to provide an effective heat transfer to the coolest parts of the tube, principally the inner wall. In addition, each of the above-referenced metallic return configurations which are cylindrical may create non-parallel field lines and give a radial potential which is not desirable. For example, this radial potential may attract ions into a region where they are of no value to the laser operation.

SUMMARY OF THE INVENTION

In one aspect, the invention is a discharge tube for a gas laser, including an elongated cylindrical tube having an inner wall and an axis, a plurality of heat-conduction members spaced apart along the cylindrical tube and about the axis, in which each heat conduction member has an outer perimeter near the inner wall and at least one gas-flow return hole near the outer perimeter, with each heat conduction member defining a volume therewithin, and a plurality of non-conductive blocking means for maintaining a relatively small volume of gas near the inner wall to flow through each gas-flow return hole. Each of the blocking means is positioned in the space between adjacent heat conduction members and outside the volume of the adjacent heat-conduction members, and each such gas barrier means is unattached to either of the adjacent heat-conduction members.

As described more fully below, the unique structure of the present invention provides a gas laser that has features and characteristics which are highly suitable for making and operating commercial gas lasers.

DETAILED DESCRIPTION OF THE INVENTION

Figure 1:
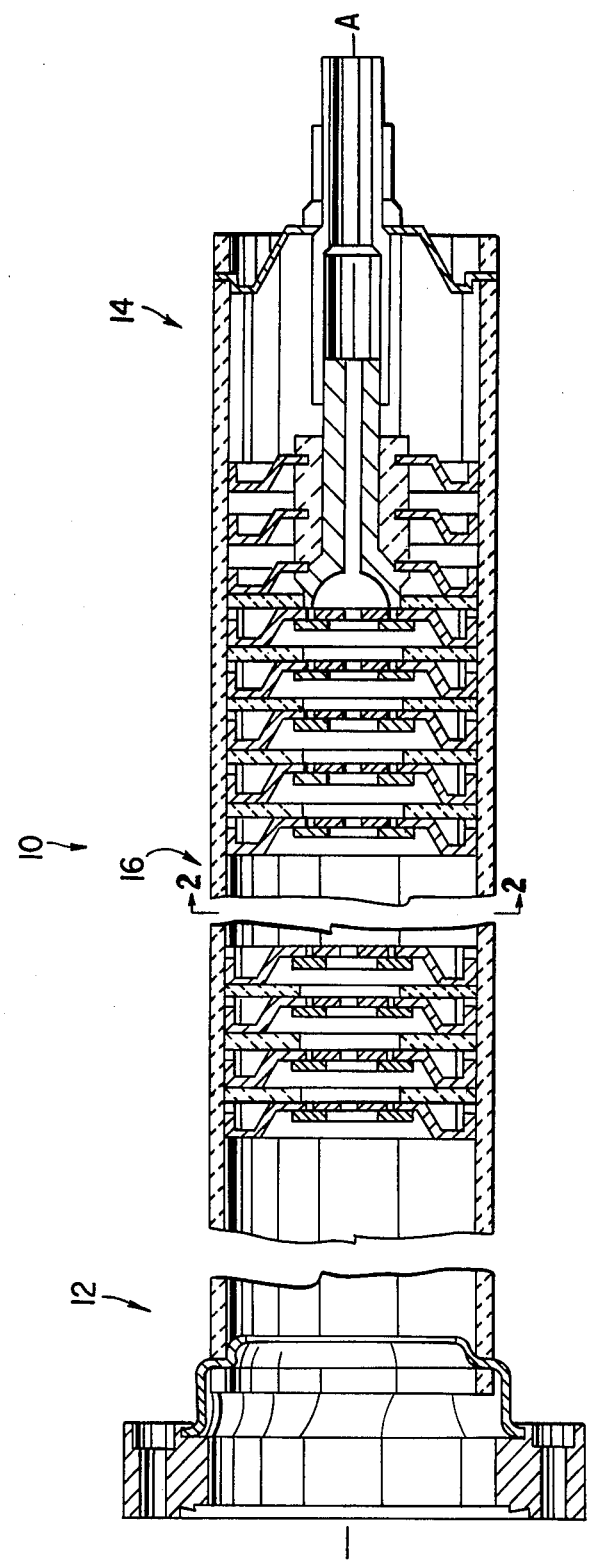
FIG. 1 is a cross-sectional view of a gas discharge tube of the present invention.

FIG. 1 illustrates a gas discharge laser 10 having a conventional cathode end shown generally at 12, a conventional anode end shown generally at 14 and an axis A. A gas discharge tube 16 of the present invention, in which the laser action is performed, extends between the cathode end 12 and the anode end 14. Additional details of the anode end 12 and cathode end 14 need not be described for purposes of explaining the present invention.

Figure 3:
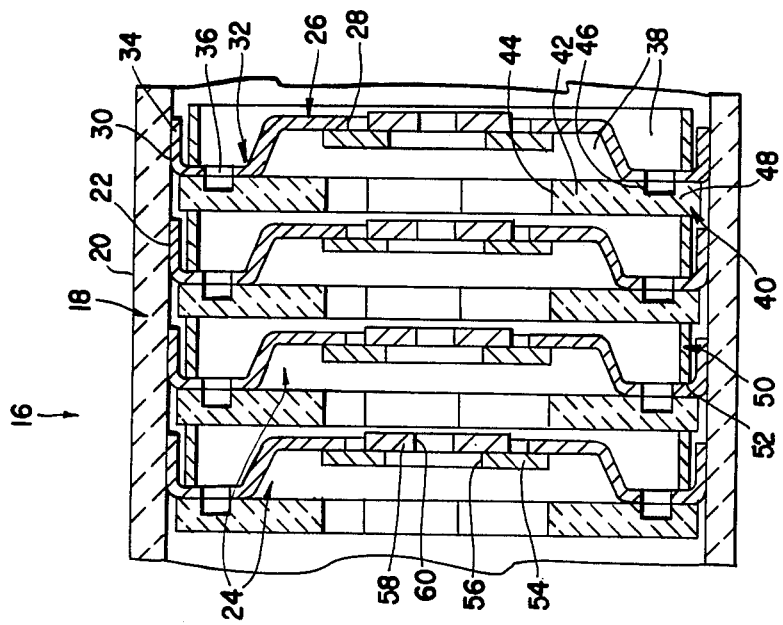
FIG. 3 is a view taken along lines 3—3 of FIG. 2.
Figure 2:
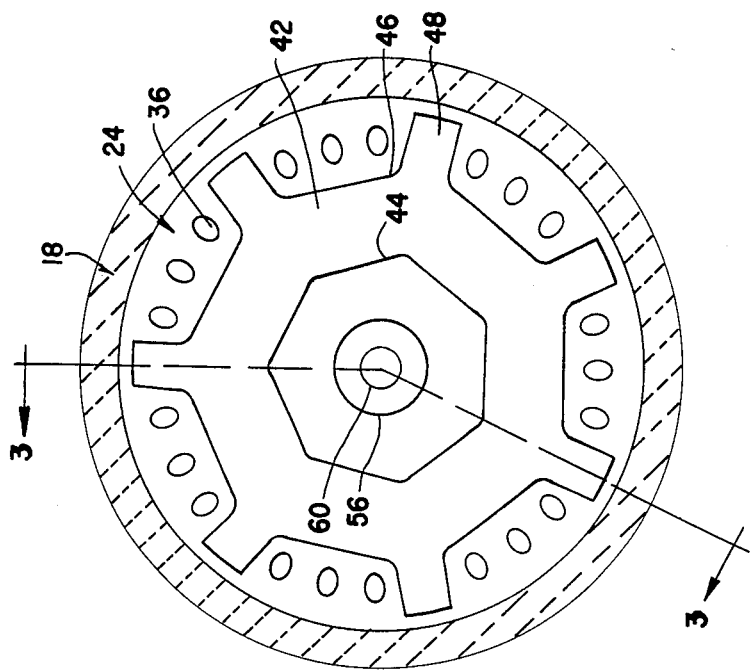
FIG. 2 is a view taken along lines 2—2 of FIG. 1.
Figure 4:
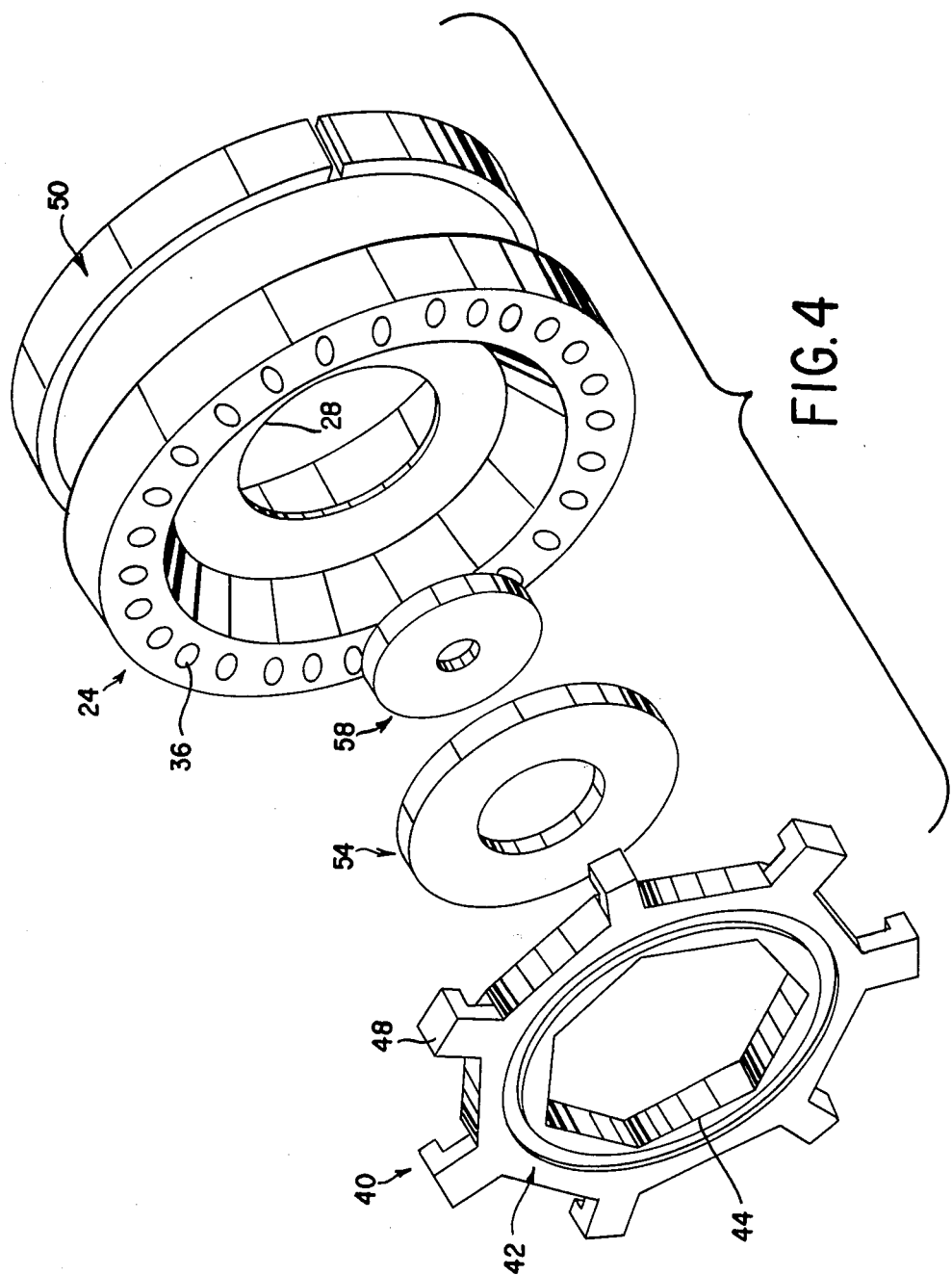
FIG. 4 is an exploded view of components of the discharge tube of FIG. 1.

With reference to FIGS. 2–4, the gas discharge tube 16 includes an elongated cylindrical tube 18, disposed about the axis A, having an outer wall 20 and an inner wall 22. A plurality of annular heat-conduction members 24 are spaced apart along the cylindrical tube 18 and about the axis A. Each heat-conduction member 24 has a generally planar surface 26 that is perpendicular to the axis A and extends from an inner aperture 28 to an outer periphery or perimeter shown generally at 30 via a deformable member shown generally at 32. The deformable member 32 is disposed generally angularly with respect to the planar surface 26 and includes an arm 34 that is, for example, brazed metallized bands situated on the inner wall 22 of precision ceramic tubing utilizing a moly-manganese braze in the manner disclosed in applicant's co-pending application U.S. Ser. No. 649,206 incorporated herein by reference. Each deformable member 32 has a gas-flow return hole 36 near the outer periphery through which gas will flow.

In view of their shape, each heat conduction member 24 has a "volume" therein within the outer perimeter 30, as shown generally by reference 38. The heat conduction members 24 function to conduct the heat from the gas discharge which occurs about the axis A to the cylindrical tube 18, which then may be in a heat transfer relationship with a water cooling jacket (not shown).

A plurality of blocking means shown generally at 40 are also disposed within the cylindrical tube 18. Each of the blocking means 40 is disposed between adjacent heat conduction members 24 and outside the volume 38 of each such adjacent heat conduction member 24, as shown. Each of the blocking means 40 is a disc-shaped member 42 having an inner, non-circular, aperture 44 (e.g., hexagonal) disposed about the axis A and an outer perimeter 46 which is interior of the gas-flow return holes 36. A plurality of tabs 48 extend from the outer perimeter 46 about the disc-shape member 42 to the inner wall 22 of the cylindrical tube 18. The disc-shaped member 42 is made of an electrically as well as thermally non-conducting material, such as a ceramic.

A plurality of spacer members 50 are included in the gas discharge tube 16. Each spacer member 50 is disposed between a given heat-conduction member 24 and a given blocking means 40, as shown. One side 52 of the spacer member 50 is attached to the deformable member 32 of the heat conduction member 24 on a radially removed portion of the deformable member situated between the inner wall 22 and each hole 36 and extends to the disc-shaped member 42 of the given blocking means 40. Accordingly, while the disc-shaped member 42 is spaced between adjacent heat-conduction members 24, and bears against one of these heat-conduction members 24, as shown, it is not affixed or attached to such a heat-conduction member 24 and being non-conductive is thermally isolated from the heat conduction path. Each spacer member 50 preferably should have the same thermo-expansion properties as the cylindrical tube 18 and, therefore, may be made, for example, of Kovar.

A washer 54 made of, for example, copper, is brazed to each heat-conduction member 24 and has an inner aperture 56 disposed about the axis A. An annular disc 58 of, for example, a sputter-resistant material such as tungsten, is welded to the washer 54 which extends within the inner aperture 28 of the heat-conduction member 26. Each disc 58 itself has an inner aperture 60 about the axis A which defines the cross-section of the gas discharge during the operation of the laser.

In the operation of the gas laser 10, a gas discharge will occur along and about the axis A, while gas will flow within the discharge tube 16 via the gas-flow return holes 36 between the cathode end 12 and anode end 14. The blocking means 40 will function to isolate a small volume of gas in the most radially removed region of the tube along the gas return path. This relatively small volume of gas near the inner wall 22 will enjoy a favorable heat exchange capability in interfacing with the coolest part of the tube, namely, the inner tube wall. This, coupled with the insulative characteristics of the blocking means, provides for lower gas viscosity and higher conductance through the return. Heat of the discharge will be dissipated via each disc 58, washer 54 and heat-conduction member 24 to the cylindrical tube 18. Since the corresponding blocking means 40 is not affixed to the adjacent heat-conduction member 24, this heat dissipation has different characteristics than if it were so affixed. Furthermore, not being so affixed, the blocking means 40 and adjacent heat-conduction member 24 can withstand a differential thermal expansion, thereby minimizing thermal stress that might otherwise occur in these components.

In addition, each member 42, being made of an electrically non-conductive material and being disc-shaped, as opposed, for example, to being cylindrical, may produce parallel field lines at the discharge area, thereby not producing an undesirable radial potential which might attract gas ions into a non-useful region of the tube 16.

Furthermore, the gas discharge tube 16 of the present invention is relatively easy to assemble. Essentially, the spaced-apart heat-conduction members 24 are stacked one on top of another, rather than nested within the volume of one another, thereby not requiring a nesting assembly operation. Also, the blocking means 40 may be merely placed between adjacent heat conduction members 24, rather than necessitating complicated geometries for heat conducting members, affixation to a heat-conduction member 24 prior to final assembly or compromise of other structural design features, both thermal and electrical.

Overall, the gas discharge tube 16 is believed to be very durable in that the laser 10 can retain power over a long period of time.

The foregoing description of preferred embodiments of the invention has been presented for purposes of illustration and description. It is not intended to be exhaustive or to limit the invention to the precise form described, and many modifications and variations are possible in light of the above teaching. The embodiments were chosen and described in order to best explain the principles of the invention and its practical application to thereby enable others skilled in the art to best utilize the invention in various embodiments and with various modification as are suited to the particular use contemplated. It is intended that the scope of the invention be defined by the claims appended hereto.

What is claimed is:
1. A discharge tube for a gas laser, comprising:
   (a) an elongated cylindrical tube having an inner wall and an axis;

(b) a plurality of annular heat-conduction members spaced apart along said cylindrical tube and about said axis, each of said heat-conduction members having an outer perimeter near said inner wall and at least one gas-flow return hole near said outer perimeter, each of said annular heat conduction members defining a volume within said outer perimeter; and (c) a plurality of blocking means for maintaining gas near said inner wall to flow through each said gas-flow return hole, said plurality of blocking means being positioned, respectively, in the space between adjacent said heat conduction members and outside the volume of said adjacent heat-conduction members, and each said blocking means being unattached to either of said adjacent heat-conduction members.

2. A discharge tube, according to claim 1, wherein said plurality of blocking means each comprises:

(a) a disc-shaped member having an inner aperture about said axis and an outer perimeter interior of said gas-flow return hole; and (b) a tab extending from said outer perimeter of said disc-shaped member to said inner wall.

3. A discharge tube, according to claim 2, wherein said disc-shaped member has a non-cylindrical inner aperture.

4. A discharge tube, according to claim 2, further comprising a spacer member for spacing said disc-shaped member between said adjacent heat-conduction members.

5. A discharge tube, according to claim 4, wherein said spacer member spaces said disc-shaped member away from one said adjacent heat-conduction member and against the other of said adjacent heat-conduction member.

6. A discharge tube for a gas laser, comprising:

(a) an elongated cylindrical ceramic tube having an axis and an inner wall;

(b) a plurality of spaced apart heat-conduction members, each said heat-conduction member having a generally planar surface extending generally perpendicular of said axis from an inner aperture about said axis to an outer perimeter thereof near said inner wall and having a deformable portion disposed generally angularly with respect to said planar surface and extending from said outer perimeter along said axis, said deformable portion being brazed to said inner wall, each said heat-conduction member having a gas-flow return hole disposed in said deformable portion near said outer perimeter, and each said heat-conduction member defining a volume within said outer perimeter; and (c) a plurality of blocking members, each positioned, respectively, in the space between two adjacent said heat-conduction members and outside said volume of said two adjacent heat-conduction members, each said blocking member being unattached to either of said adjacent heat-conduction members.

7. A discharge tube, according to claim 6, wherein each of said blocking members comprises:

(a) an annular disc-shaped member extending generally perpendicular of said axis from an inner aperture to an outer perimeter thereof, said outer perimeter of said annular disc-shaped member being interior of said gas-flow return hole; and (b) a tab extending from said outer perimeter of said annular disc-shaped member to said inner wall of said elongated cylindrical ceramic tube to space said annular disc-shaped member from said inner wall.

8. A discharge tube, according to claim 7, wherein said disc-shaped member has a non-cylindrical inner aperture.

9. A discharge tube, according to claim 7, wherein said annular disc-shaped member is formed of an electrically and thermally non-conducting material.

10. A discharge tube, according to claim 7, wherein said annular disc-shaped member is a ceramic.

11. A discharge tube, according to claim 7, further comprising a spacer member for spacing said annular disc-shaped member between adjacent heat-conduction members.

12. A discharge tube, according to claim 11, wherein said spacer member spaces said annular disc-shaped member away from one of said adjacent heat-conduction members and against the other of said heat-conduction members.

13. A discharge tube, according to claim 12, wherein said spacer member is elongated and has one end attached to said one adjacent heat-conduction member near said outer perimeter on a radially removed portion of said one adjacent heat-conduction member and another end against said tab of said annular disc-shaped member.

14. A discharge tube, according to claim 13, wherein said spacer member is made of a material having substantially the same thermo-expansion properties of said elongated cylindrical tube.

15. A discharge tube, according to claim 13, wherein said spacer member is made of Kovar.

16. A discharge tube, according to claim 6, further comprising a plurality of spacer members for spacing, respectively, said plurality of blocking members between said adjacent heat-conduction members.

17. A discharge tube, according to claim 6, further comprising:

(a) a plurality of washers affixed, respectively, to said plurality of heat-conduction members near said inner apertures thereof; and (b) a plurality of annular discs affixed to said plurality of washers, respectively, and said annular discs extending within said inner apertures of said plurality of heat-conduction members and having inner apertures about said axis.

18. A discharge tube, according to claim 17, wherein each of said washers is made of material having sufficient heat conductivity as to substantially remove a predetermined amount of heat from said discharge tube, and each of said annular discs is made of a sputter resistant material having substantially similar heat conductivity properties as each of said washers.

19. A discharge tube, according to claim 17, wherein each of said washers is made of copper, and each of said annular discs is made of tungsten.

* * * * *